Aug. 28, 1951 — G. E. DATH — 2,565,650
FRICTION SNUBBER FOR RAILWAY CAR TRUCKS
Filed Nov. 13, 1948 — 2 Sheets-Sheet 1
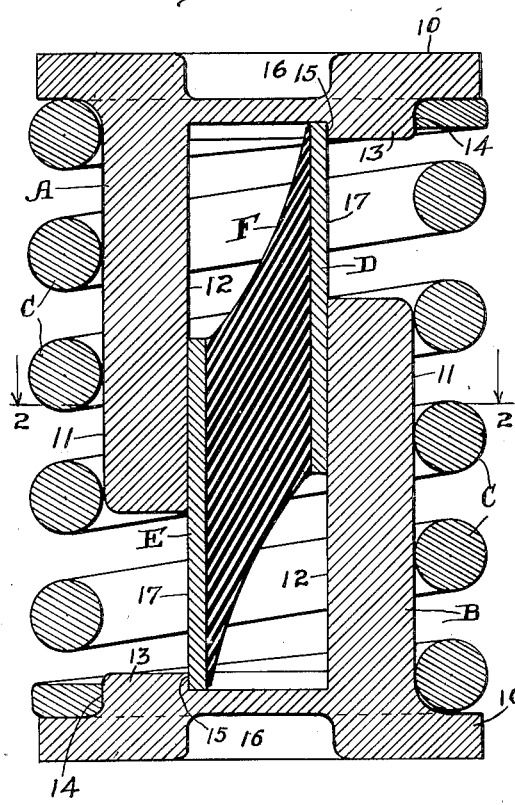
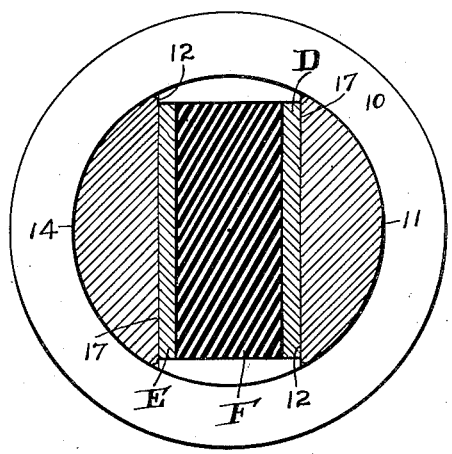
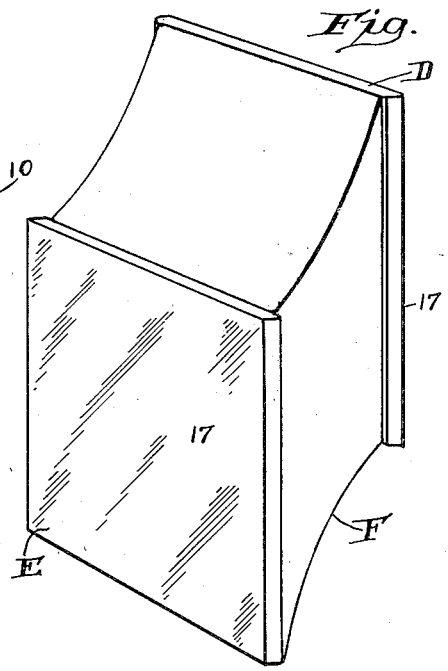
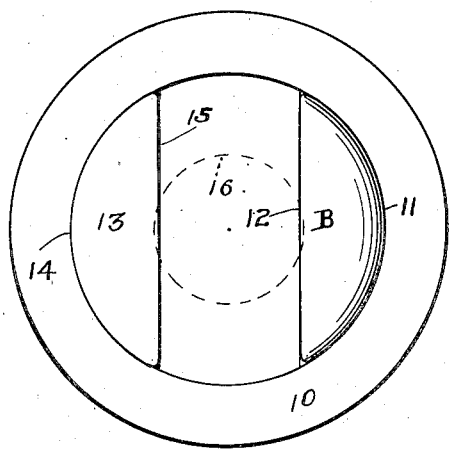
Inventor:
George E. Dath.
By Henry Fuchs.
Atty Aug. 28, 1951      G. E. DATH      2,565,650
FRICTION SNUBBER FOR RAILWAY CAR TRUCKS
Filed Nov. 13, 1948      2 Sheets-Sheet 2

Inventor:
George E. Dath.
By Henry Fuchs.
Atty

Patented Aug. 28, 1951

2,565,650

UNITED STATES PATENT OFFICE 2,565,650

FRICTION SNUBBER FOR RAILWAY CAR TRUCKS

George E. Dath, Mokena, Ill., assignor to W. H. Miner, Inc., Chicago, Ill., a corporation of Delaware Application November 13, 1948, Serial No. 59,859

10 Claims. (Cl. 267—9)

This invention relates to improvements in friction shock absorbers, especially adapted for use in connection with truck springs of railway cars, for snubbing the action of the springs.

One object of the invention is to provide a friction shock absorber of the character indicated, comprising relatively lengthwise movable, top and bottom, interengaging friction elements, and a coil spring surrounding the friction elements and opposing relative movement thereof toward each other, wherein yielding means is provided for forcing the friction elements into tight frictional engagement with each other and with the interior of the coil spring, thereby producing the required resistance to snub the action of the usual truck spring.

A further object of the invention is to provide a mechanism as set forth in the preceding paragraph, wherein the yielding means for forcing the friction elements into engagement with each other, and into engagement with the interior of the coil spring, is in the form of a rubber member which is interposed between the innermost of the friction elements and is expanded during compression of the mechanism, and further functions to yieldingly oppose relative lengthwise movement of the innermost friction elements toward each other and to return the same to their normal position upon recoil of the shock absorber and truck springs.

A more specific object of the invention is to provide, in a mechanism as hereinbefore set forth, a rubber member of the character indicated, which is placed under shear as the mechanism is being compressed.

Other objects of the invention will more clearly appear from the description and claims hereinafter following.

Figure 5:
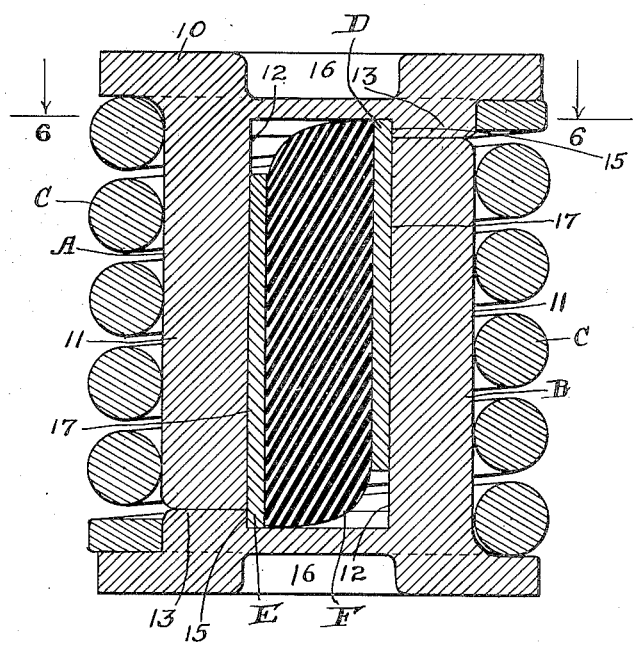
Figure 6:
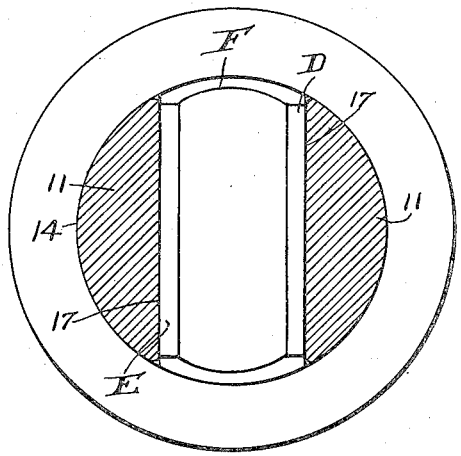

In the accompanying drawings forming a part of this specification, Figure 1 is a central, transverse, vertical sectional view of my improved shock absorber. Figure 2 is a horizontal sectional view, corresponding substantially to the line 2—2 of Figure 1. Figure 3 is a top plan view of the bottom friction post of the improved shock absorber. Figure 4 is a perspective view of the rubber member and the friction plates of the improved shock absorber illustrated in Figures 1 and 2. Figure 5 is a view similar to Figure 1, showing the shock absorber fully compressed. Figure 6 is a horizontal sectional view, corresponding substantially to the line 6—6 of Figure 5.

As illustrated in the drawings, my improved shock absorber comprises broadly top and bottom friction posts A and B, a helical coil spring C surrounding the posts, top and bottom friction plates D and E engaging the inner sides of the posts, and a rubber block F interposed between the plates D and E.

The top and bottom friction posts A and B are of similar design, each post having a follower member 10 in the form of a disc at its outer end. As shown in Figure 1, the top post A depends from the top follower member or disc 10 and is located at the left hand side of the mechanism, and the bottom post B is upstanding from the bottom follower 10 and is located at the right hand side of the mechanism. Each post A and B has a transversely curved outer surface 11, which extends vertically, the surfaces 11—11 of the two posts being substantially concentric in the normal position of the parts, as shown in Figures 1, 2 and 3. On the inner side, each post presents a substantially flat, vertically extending friction surface 12.

Each follower member 10 has a projecting lug 13 on the inner side thereof, which is located at that side of the follower which is diametrically opposite to the post, being spaced from the inner side of the latter. The lug 13 of each follower has a curved outer face 14, concentric with the curved outer surface 11 of the post, and a transverse inner flat abutment face 15, substantially parallel to the friction surface 12 of the post.

On the outer side thereof, each follower is recessed to provide a seat 16 to accommodate the usual centering projection on the corresponding spring follower plate of the truck spring cluster of the railway car.

The spring C is in the form of a helical coil surrounding the posts A and B and has its top and bottom ends bearing on the top and bottom followers 10—10, respectively. The interior diameter of the spring C is such that it snugly embraces the posts A and B with the curved outer surfaces 11—11 of the posts in frictional contact with the interior sides of the coils of the spring.

The top and bottom friction plates D and E are of the same design, each plate being of substantially rectangular outline and presenting a flat friction surface 17 on its outer side. The top friction plate D is located at the right hand side of the mechanism and has its upper end bearing on the top follower 10, with its outer side at said upper end abutting the flat inner surface of the lug 13 of the follower. The bottom friction plate E is similarly arranged, having its lower end bearing on the bottom follower 10 and its outer side abutting the lug 13 of the bottom follower. The top plate D has its friction surface 17 in sliding contact with the friction surface 12 of the bottom post B, and the bottom plate E has the friction surface 17 thereof in sliding contact with the friction surface 12 of the top post A. As shown in Figure 1, the post B and the plate E normally have their upper ends spaced from the top follower 10, the plate being spaced a greater distance therefrom than the post, and the post A and the plate D having their lower ends normally spaced from the bottom follower, the spacing of the post A from the bottom follower 10 being the same as that of the top follower 10 and the post B, so that when the mechanism is fully compressed the respective posts engage the opposed followers to limit compression of the spring C. The posts thus form a solid column to transmit the load from one follower to the other and prevent undue distortion of the rubber block F and further compression of the spring C of the device.

The block F is interposed between the plates D and E and, in its normal, non-distorted condition, is of the shape illustrated in Figures 1, 2, and 4, being of the vertical, transverse, cross sectional shape shown in Figure 1, and of substantially rectangular, horizontal cross section, as shown in Figure 2. The opposite sides of the block F are fixed to the inner sides of the plates D and E, being preferably vulcanized to the same. The sides of the block F, which are secured to the plates D and E, are coextensive with these plates, and the top and bottom sides of the block, which are inclined as shown in Figure 1, are preferably bowed inwardly. In the assembled condition of the mechanism, the rubber block F is preferably under slight initial lateral compression between the plates D and E to hold the plates against the posts B and A and press the latter against the interior of the spring C. As will be evident, the spring C acts in the manner of a friction casing or shell within which the posts A and B are slidable.

My improved shock absorber preferably replaces one or more of the spring units of a truck spring cluster, the same being interposed between the usual top and bottom spring plates of the truck spring cluster, and being compressed with the truck springs as the spring plates approach each other in service.

The operation of my improved shock absorber is as follows: Upon the spring cluster of the truck of a car being compressed between the spring follower plates of said cluster, the improved shock absorber is compressed therewith between said plates, forcing the post A and the friction plate D downwardly with respect to the post B and the friction plate E, and compressing the coil spring C between the followers 10—10 of said posts. During downward movement of the top friction plate D with respect to the bottom friction plate E, the rubber block F is distorted, being placed under shear. Distortion of the rubber block F yieldingly opposes relative lengthwise movement of the plates D and E toward each other and forces the plates laterally apart into tight frictional contact with the posts B and A. This expansive action of the block F and the plates D and E also forces the posts apart into tight frictional contact with the interior of the spring C. High frictional resistance is thus produced between the plates and posts and between the posts and the coil spring C to snub the action of the truck springs.

When the mechanism has been fully compressed, the parts assume substantially the positions shown in Figure 5, relative approach of the posts and plates being arrested by engagement of the outer end of each post with the opposed follower.

As the spring follower plates of the truck spring cluster are separated, due to recoil of the springs, the followers 10—10 of the friction posts A and B are moved apart lengthwise by the expansive action of the spring C, and the friction plates are also moved apart lengthwise of the mechanism by the resilient action of the rubber block F in returning to its original non-distorted state.

As will be evident, snubbing of the truck springs is also effected during recoil of said springs, due to the frictional resistance provided by the interengaged friction plates, posts, and outer coil spring.

I claim:

1. In a shock absorber, the combination with relatively lengthwise movable, laterally spaced friction posts; of a coil spring surrounding said posts in embracing relation and opposing relative movement of said posts toward each other; a pair of friction plates having sliding frictional engagement with the inner sides of the posts, said plates being relatively movable lengthwise with respect to each other and mounted to move in unison respectively with said posts; and yielding means interposed between said plates for pressing the same laterally against the posts and pressing the posts laterally apart against the interior of said coil spring.

2. In a shock absorber, the combination with relatively lengthwise movable, laterally spaced friction posts; of a coil spring surrounding said posts and opposing relative lengthwise movement thereof toward each other; a pair of friction plates interposed between said posts, said plates being relatively movable with respect to each other lengthwise of the mechanism, each of said plates being mounted to move in unison respectively with one of said posts relatively to the other post and having sliding frictional engagement with said last named post; and yielding means interposed between said plates for spreading the same apart against said posts, and forcing the posts into contact with the interior of said coil spring.

3. In a shock absorber, the combination with relatively lengthwise movable, laterally spaced friction posts; of a coil spring surrounding said posts in embracing relation and opposing relative movement of said posts toward each other; a pair of friction plates having sliding frictional engagement with the inner sides of the posts, said plates being relatively movable lengthwise with respect to each other; and a rubber block interposed between said plates for pressing the same laterally against the posts and pressing the posts laterally apart against the interior of said coil spring.

4. In a shock absorber, the combination with relatively lengthwise movable, laterally spaced friction posts; of a coil spring surrounding said posts and opposing relative lengthwise movement thereof toward each other; a pair of friction plates interposed between said posts, said plates being relatively movable with respect to each other lengthwise of the mechanism, each of said plates being mounted to move in unison respectively with one of said posts relatively to the other post and having sliding frictional engagement with said last named post; a rubber block interposed between said plates for spreading the same apart against said posts, and forcing the posts into contact with the interior of said coil spring.

5. In a shock absorber, the combination with relatively lengthwise movable, laterally spaced friction posts; of a coil spring surrounding said posts in embracing relation and opposing relative movement of said posts toward each other; a pair of friction plates having sliding frictional engagement with the inner sides of the posts, said plates being relatively movable lengthwise with respect to each other; and a rubber block interposed between said plates for pressing the same laterally against the posts and pressing the posts laterally apart against the interior of said coil spring, said rubber block being secured at opposite sides to the inner sides of said plates.

6. In a shock absorber, the combination with relatively lengthwise movable, laterally spaced friction posts; of a coil spring surrounding said posts and opposing relative lengthwise movement thereof toward each other; a pair of friction plates interposed between said posts, said plates being relatively movable with respect to each other lengthwise of the mechanism, each of said plates being mounted to move in unison respectively with one of said posts relatively to the other post and having sliding frictional engagement with said last named post; and a rubber block interposed between said plates for spreading the same apart against said posts, and forcing the posts into contact with the interior of said coil spring, said rubber block being secured at opposite sides to the inner sides of said plates.

7. In a shock absorber, the combination with top and bottom, relatively movable, laterally spaced friction posts; of a coil spring surrounding said posts in embracing relation, said spring opposing relative movement of the posts toward each other; top and bottom friction plates having sliding frictional engagement with the inner sides of said bottom and top posts, respectively, said top plate being mounted to move in unison with said top post and said bottom plate being mounted to move in unison with said bottom post; and yielding means interposed between said plates for pressing the same laterally against the posts and pressing the posts laterally apart against the interior of said coil spring.

8. In a shock absorber, the combination with top and bottom, relatively movable, laterally spaced friction posts; of a coil spring surrounding said posts in embracing relation, said spring opposing relative movement of the posts toward each other; top and bottom friction plates having sliding frictional engagement with the inner sides of said bottom and top posts, respectively, said top plate being mounted to move in unison with said top post and said bottom plate being mounted to move in unison with said bottom post; and a rubber block interposed between said plates for pressing the same laterally against the posts and pressing the posts laterally apart against the interior of said coil spring, said rubber block having the sides thereof which engage said plates vulcanized to the latter.

9. In a shock absorber, the combination with top and bottom followers; of a top friction post depending from said top follower; a bottom friction post upstanding from said bottom follower, said posts being laterally spaced apart; a coil spring surrounding said posts in embracing relation and bearing at its top and bottom ends on said top and bottom followers, respectively; top and bottom friction plates having sliding frictional engagement with the inner sides of said bottom and top posts, respectively, said top plate being engaged by the top follower to move downwardly with the latter, and said bottom plate resting on said bottom follower; and a rubber block interposed between said plates in contact with the same and having the sides thereof which contact the plates fixedly secured to the same.

10. In a shock absorber, the combination with top and bottom followers; of a top friction post depending from said top follower; a bottom friction post upstanding from said bottom follower, said posts being laterally spaced apart; a coil spring surrounding said posts in embracing relation and bearing at its top and bottom ends on said top and bottom followers, respectively; top and bottom friction plates having sliding frictional engagement with the inner sides of said bottom and top posts, respectively, said top plate being engaged by the top follower to move downwardly with the latter, and said bottom plate resting on said bottom follower; and a rubber block between said plates, said plates being vulcanized at their inner sides to said rubber block.

GEORGE E. DATH.

REFERENCES CITED

The following references are of record in the file of this patent:

UNITED STATES PATENTS

| Number | Name | Date |
|---|---|---|
| 2,141,522 | Duryea | Dec. 27, 1938 |
| 2,352,030 | Sproul | June 20, 1944 |
| 2,444,989 | Haseltine | July 13, 1948 |